United States Patent [19]

Yamanoue et al.

[11] Patent Number: 4,603,581
[45] Date of Patent: Aug. 5, 1986

[54] SENSING APPARATUS

[75] Inventors: Kouichi Yamanoue; Junji Kitagawa; Shigeyuki Akita, all of Okazaki; Akira Kuno, Oobu, all of Japan

[73] Assignees: Nippon Soken, Inc., Nishio; Nippondenso Co., Ltd., Kariya, both of Japan

[21] Appl. No.: 697,005

[22] Filed: Jan. 31, 1985

[30] Foreign Application Priority Data

Feb. 14, 1984 [JP] Japan .................................. 59-26839

[51] Int. Cl.⁴ ............................................ G01F 23/26
[52] U.S. Cl. .................................. 73/304 C; 340/620; 361/284
[58] Field of Search ........................ 73/304 C, 304 R; 340/620; 361/284; 200/61.05; 367/908

[56] References Cited

U.S. PATENT DOCUMENTS

| | | | |
|---|---|---|---|
| 2,644,050 | 6/1953 | Seiger | 200/61.05 |
| 2,996,915 | 8/1961 | Greenwood et al. | 361/284 |
| 3,553,575 | 1/1971 | Shea | 73/304 C |
| 3,986,110 | 10/1976 | Overall et al. | 73/304 C |
| 4,092,860 | 7/1978 | Arts et al. | 73/304 R |
| 4,099,167 | 7/1978 | Pomerantz et al. | 340/620 |
| 4,142,415 | 3/1979 | Jung et al. | 73/304 C |
| 4,145,927 | 3/1979 | Larson | 73/304 C |
| 4,201,085 | 5/1980 | Larson | 361/284 |
| 4,295,370 | 10/1981 | Bristol | 73/304 C |
| 4,316,158 | 2/1982 | Akita et al. | 331/111 |
| 4,479,116 | 10/1984 | Kobayashi | 340/620 |

FOREIGN PATENT DOCUMENTS

| | | | |
|---|---|---|---|
| 2606575 | 8/1977 | Fed. Rep. of Germany | 73/304 C |
| 3220635 | 12/1983 | Fed. Rep. of Germany | 73/304 C |
| 0109867 | 8/1979 | Japan | 73/304 C |
| 0581596 | 2/1946 | United Kingdom | 73/304 |

Primary Examiner—Charles Frankfort
Assistant Examiner—Thomas B. Will
Attorney, Agent, or Firm—Cushman, Darby & Cushman

[57] ABSTRACT

A sensing apparatus including: a first electrode member; a second electrode member arranged at opposing positions a predetermined distance away and electrically isolated from the first electrode member; and an electric circuit connected to the first and second electrode members. The first and the second electrode members are operatively connected by an impedance formed between the first and the second electrode members in response to existence of a substance to be sensed between the first and the second electrode members. The electric circuit outputs a signal in response to the impedance. The sensing apparatus is applicable for detecting, for example, the level of a liquid in a vessel.

25 Claims, 18 Drawing Figures

SENSING APPARATUS

BACKGROUND OF THE INVENTION

1. Field of the Invention

The present invention relates to a sensing apparatus, more particularly to an apparatus sensing existence of a substance in response to a change of a capacitance generated between electrodes.

The sensing apparatus of the present invention can be applied to, for example, a level measuring sensor or an apparatus detecting existence of a substance in a container.

2. Description of the Related Art

Many types of sensing apparatuses are known for detecting existence of a substance, for example, for measuring a liquid level in a container. One of the more representative ones is the float-type level meter. A float-type level meter measures a container liquid level in response to the position of a float installed in the container.

The prior art level meter suffers from disadvantages such as the difficult installation of the float and/or electric or mechanical mechanism cooperating therewith in the container, complex construction, low reliability due to the complex construction and movable members, frequent need for maintenance, low speed response, and low accuracy.

SUMMARY OF THE INVENTION

It is an object of the present invention to provide a sensing apparatus having a simple construction and thus offering easy installation, easy maintenance, high reliability, and high speed response.

It is another object of the present invention to provide a sensing apparatus able to sense a variety of physical quantities of a variety of substances with simple modifications.

According to the present invention, there is provided a sensing apparatus including: a first electrode member; a second electrode member arranged at an opposing position a predetermined distance away and electrically isolated from the first electrode member; and electric circuit means connected to the first and second electrode members. The first and second electrode members are operatively connected by an impedance formed between the first and the second electrode members in response to existence of a substance to be sensed between the first and the second electrode members. The electric circuit means outputs a signal in response to the impedance.

BRIEF DESCRIPTION OF THE DRAWINGS

Other objects and features of the present invention will be explained below in detail with reference to the accompanying drawings, in which.

DESCRIPTION OF THE PREFERRED EMBODIMENTS

Figure 1:
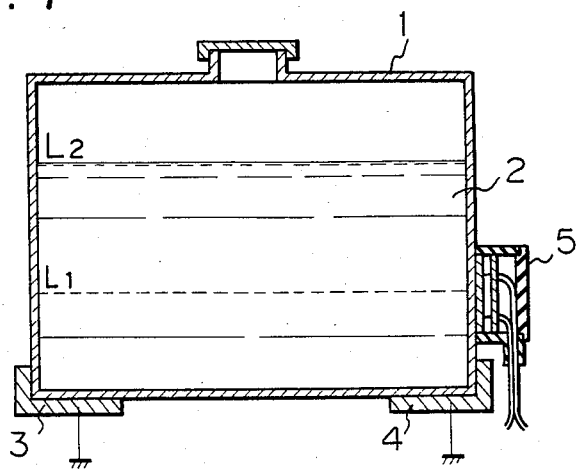
FIG. 1 is a sectional view of an embodiment of a sensing system in accordance with the present invention.

FIG. 1 is a sectional view of a sensing system for detecting existence of a liquid in a vessel. In FIG. 1, the sensing system includes a vessel or containing means 1 made of an electrical-insulating material such as plastic, a liquid 2 to be detected and accommodated in the vessel 1, electroconductive vessel supports 3 and 4, both connected to the ground, and a sensing apparatus 5 mounted on an outer surface of the vessel 1.

Figure 2:
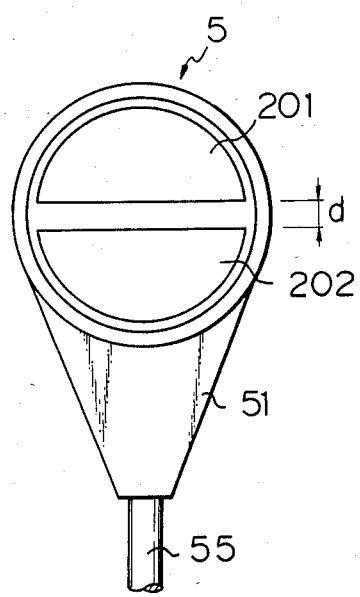
FIG. 2 is a plane view of an embodiment of the sensing apparatus of the present invention shown in FIG. 1.
Figure 3:
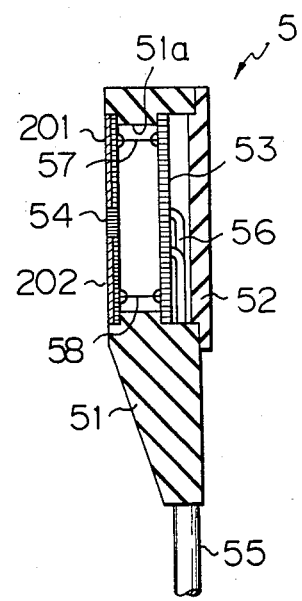
FIG. 3 is a sectional view of the sensing apparatus shown in FIG. 2.

FIGS. 2 and 3 are plane and sectional views of an embodiment of the sensing apparatus 5. In FIGS. 2 and 3, the sensing apparatus 5 includes a housing 51 of an electrical insulating material, a cover 52 made of an electrical insulating material, printed circuit (PC) boards 53 and 54, pins 57 and 58 connecting the PC boards 53 and 54, and a lead cable 55 having a wire end 56 connected to the PC board 53.

The PC board 54 is made of an electrical insulating material and is provided with a pair of electrodes 201 and 202 arranged at opposing positions over a predetermined distance d and electrically isolated from each other. The distance d between the electrodes 201 and 202 is defined so that an impedance including a capacitive component may be formed between the electrodes 201 and 202 due to specific inductive capacities (relative permittivities or dielectric constants) of the vessel 1 and the liquid 2. Thus, the electrodes 201 and 202 can be operatively connected by the impedance. This will be explained later in detail.

The electrodes 201 and 202 have flat surfaces to enable good contact with an outer surface of the vessel 1 when the sensing apparatus 5 is mounted.

Figure 4:
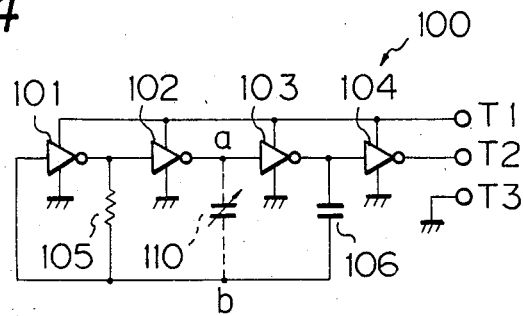
FIG. 4 is a circuit diagram of an embodiment of an oscillation circuit built into the sensing apparatus shown in FIG. 2.

The PC board 53 is made of an electrical insulating material and includes an oscillation circuit as shown in FIG. 4. The PC board 53 is connected with the lead cable 55 for transmitting the output signal from the oscillation circuit to an external circuit (not shown) and for supplying power from a power source (not shown) to the oscillation circuit.

The PC boards 53 and 54 are mounted at opposing positions on the housing 51 through an inner projection 51a. The electroconductive pins 57 and 58 are soldered between them to, on one side, the corresponding electrodes on the PC board 54 and, on the other side, the oscillation circuit on the PC board 53, to add the impedance to the oscillation circuit as shown in FIG. 4.

FIG. 4 is a circuit diagram of the oscillation circuit 100 on the PC board 53. In FIG. 4, the oscillation circuit 100 consists of four series-connected inverters 101 to 104, a resistor 105 having a resistance $R_1$, and a capacitor 106 having a capacitance $C_2$. The oscillation circuit 100 has terminals $T_1$ for supplying power to the inverters 101 to 104, $T_2$ for outputting the oscillated signal, and $T_3$ for connection to the ground. The electrodes 201 and 202 are connected to points a and b in FIG. 4 by the pins 57 and 58, so that the capacitor 110, which may be formed between the electrodes 201 and 202, is operatively connected between the points a and b in FIG. 4.

The capacitance $C_1$ of the capacitor 110 between the electrodes 201 and 202 varies depending on the existence of the liquid 2 to be detected in the vessel 1. When the liquid 2 is not filled in the vessel 1 or the level is lower than a level $L_1$ shown by a dotted line in FIG. 1 and corresponding to the bottom of the upper electrode 201 in the sensing apparatus 5 mounted on the vessel 1, the capacitance $C_1$ is defined by the specific inductive capacity of the vessel 1 of the insulator. When, the liquid 2 is filled in the vessel 1 to a level $L_2$ shown in FIG. 1 over the level $L_1$ the capacitance $C_1$ is defined by both the specific inductive capacities of the vessel 1 and the liquid 2 to be detected.

Figure 5:
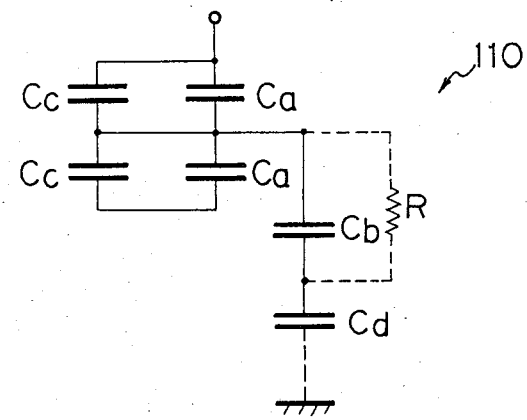
FIG. 5 is an equivalent circuit diagram of an impedance formed between electrodes in the sensing apparatus shown in FIGS. 2 and 3.

FIG. 5 is an equivalent circuit of the capacitor 110. In FIG. 5, reference $C_a$ designates a capacitor having a capacitance $C_a$ between the electrodes 201 and 202 in accordance with the specific inductive capacity of the vessel 1, and reference $C_c$ a capacitor having a capacitance $C_c$ between the electrodes due to the specific inductive capacity of the liquid 2. Reference $C_d$ designates a capacitor $C_d$ having a capacitance $C_d$, which may be formed due to the potential difference between the ground connected to the supports 3 and 4 and the ground line of the oscillation circuit 100. Reference $C_b$ designates a capacitor having a capacitance $C_b$ formed between the liquid 2 in the vessel 1 and the outer surfaces contacting with the supports 3 and 4.

The formation of the circuit shown in FIG. 5 will be explained.

When the liquid 2 is filled over the level $L_1$, the capacitance $C_1$ is expressed as the total capacitance of the capacitors $C_a$, $C_b$, $C_c$, and $C_d$, as shown in FIG. 5. If the liquid 2 is a conductive substance, such as a water, a resistor having a resistance R will result between the capacitor $C_b$ and be operatively connected in parallel to the capacitor $C_b$, as shown by a dotted line in FIG. 5. In this case, when one end of the capacitor $C_d$ is operatively connected to the ground line of the oscillation circuit 100 without an impedance component or with a considerably small impedance component, the effective capacitance $C_1$ for determining the oscillation frequency in the oscillation circuit 100 is smaller than the capacitance obtained when the liquid 2 is filled lower than the level $L_1$.

On the other hand, if the liquid 2 is a non-conductive substance, such as oil, the resistor R shown in FIG. 5 does not exist. In this case, the capacitance $C_1$ when the liquid 2 is filled over the level $L_1$ is larger than that when the liquid 2 is filled lower than the level $L_1$, because the capacitance $C_c$ due to the specific inductive capacity of the non-conductive liquid 2 is added.

Even if the liquid 2 is a conductive substance, if the end of the capacitor $C_d$ which was operatively connected with the ground line of the oscillation circuit 100 in the above description is completely isolated from the ground line, the capacitance $C_1$ may rise by a certain value defined by the specific inductive capacity of the conductive liquid 2.

When the liquid 2 is not filled over the level $L_1$, the capacitance $C_1$ is basically determined by the specific inductive capacity of the non-conductive vessel 1.

Figure 6A:
FIGS. 6A to 6C are waveforms of an output signal from the oscillation circuit shown in FIG. 4.
Figure 6B:
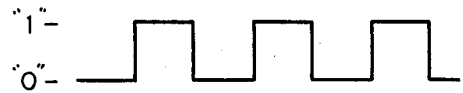
Figure 6C:

FIGS. 6A to 6C are waveforms of the different output signals generated from the oscillation circuit 100 in response to changes of the capacitance $C_1$.

FIG. 6A is a waveform of the output signal from the oscillation circuit 100 when the liquid is not filled over the level $L_1$.

FIG. 6B is a waveform of the output signal when the liquid 2 is a non-conductive substance, such as oil, and the liquid 2 is filled over the level $L_1$. In this case, the capacitance $C_1$ is larger than that of the case of FIG. 6A. As a result, the oscillation frequency of the output signal shown in FIG. 6B is lower than that shown in FIG. 6A.

FIG. 6C is a waveform of the output signal when the liquid 2 is a conductive substance, such as water, and is filled over the level $L_1$. In this case, as shown in FIG. 5, the resistor R is formed, whereby the capacitance $C_1$ becomes small. Accordingly, the oscillation frequency of the output signal becomes high.

As mentioned above, the capacitance $C_1$ varies due to existence of the liquid to be sensed as well as the specific inductive capacity and/or the resistance of the liquid. Consequently, the oscillation frequency of the output signal from the oscillation circuit 100 varies in response to the change of the capacitance $C_1$. In other words, the output oscillation frequency indicates existence of the liquid and/or a grade or property of the liquid.

The sensing apparatus of the embodiment is applicable to sense other substances, such as powder, granules, large solids, and gas having a predetermined specific inductive capacity.

In the above embodiment, the oscillation circuit 100 is provided on the PC board 53. However, the circuit 100 can also be provided at another portion separate from the PC board 53.

The sensing apparatus, including at least the pair of electrodes 201 and 202, can also be installed inside the vessel 1, for example, on an inner wall of the vessel 1. In this case, it is not necessary for the vessel wall to be made of a non-conductive material. In order to sense a conductive substance, however, the pair of electrodes 201 and 202 must be electrically isolated from the conductive substance by, for example an electrical insulating covering provided on the pair of electrodes and forming a part of the housing 51 on the cover 52.

Figure 7:
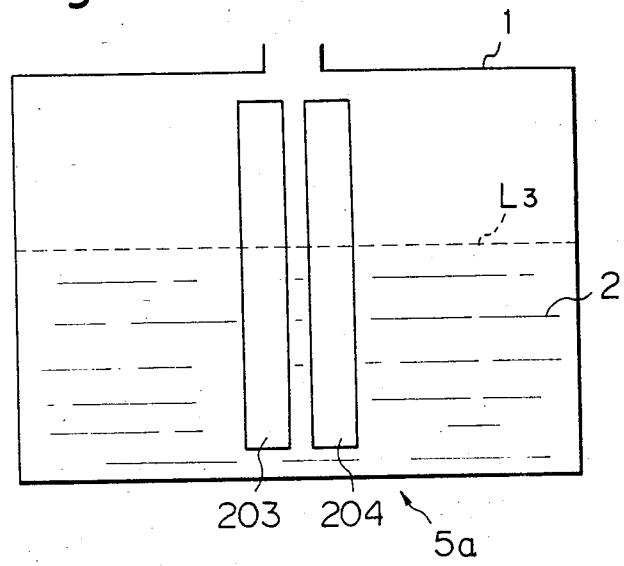
FIG. 7 is an elevational view of another embodiment of the sensing system in accordance with the present invention.

FIG. 7 is an elevational view of another embodiment of a sensing system of the present invention.

In FIG. 7, a sensing apparatus 5a includes a pair of electrodes 203 and 204 arranged at opposing positions over a predetermined distance and electrically isolated from each other. The pair of electrodes 203 and 204 are mounted on the outer side surface of the vessel 1 and arranged so their longitudinal axes perpendicularly intersect the level $L_3$ of the liquid 2. Each electrode forms a long belt. Other elements in the sensing apparatus 5a are omitted in FIG. 7.

The impedance, more particularly, the capacitance of the capacitance $C_1$, which may be formed between the electrodes 203 and 204, varies in response to the level of the liquid 2. As mentioned above, the capacitance $C_1$ defines the oscillation frequency in an oscillation circuit (not shown) similar to the oscillation circuit 100 shown in FIG. 4. Accordingly, the sensing apparatus senses the level of the liquid 2.

Figure 8:
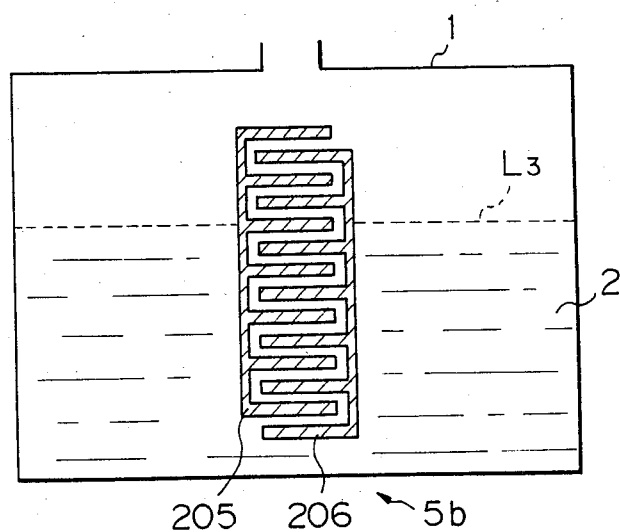
FIG. 8 is an elevational view of still another embodiment of the sensing system in accordance with the present invention.

FIG. 8 is an elevational view of still another embodiment of a sensing system of the present invention.

In FIG. 8, a sensing apparatus 5b includes a pair of interdigital electrodes 205 and 206 arranged at opposing positions over a predetermined distance and electrically isolated from each other. The pair of interdigital electrodes 205 and 206 are mounted on the outer side surface of the vessel 1 with their longitudinal axes perpendicular to the liquid level $L_3$. In FIG. 8, other elements in the sensing apparatus 5b are also omitted.

The capacitance $C_1$, which may be formed between the electrodes 205 and 206, varies in response to the liquid level $L_3$ traversing the teeth of electrode pair 205 and 206. The variation of the capacitance $C_1$ is stepwise due to the interdigital pattern of the electrodes. When the electrodes 205 and 206 are connected to an oscillation circuit (not shown) similar to that shown in FIG. 4, the circuit outputs a signal having an oscillation frequency defined by the capacitance $C_1$.

Figure 9:
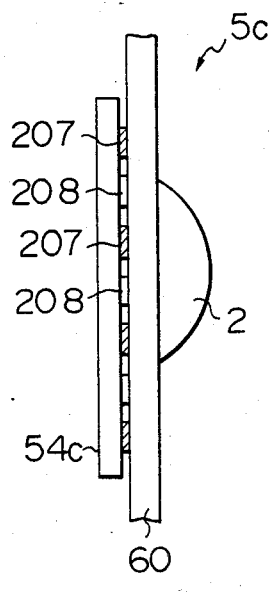
FIG. 9 is a side view of another alternative of the sensing apparatus in accordance with the present invention.
Figure 10:
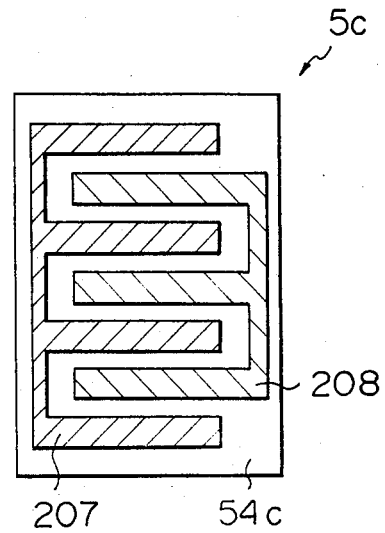
FIG. 10 is a plane view of the sensing apparatus shown in FIG. 10.

FIGS. 9 and 10 are views of another embodiment of a sensing apparatus in accordance with the present invention.

In FIGS. 9 and 10, a sensing apparatus 5C includes a plate 60 made of an insulating material, a PC board 54C, and a pair of interdigital electrodes 207 and 208 mounted on the PC board 54C and projecting therefrom to the plate 60 to closely contact one side of the plate 60. Drops, etc. of the liquid 2, may adhere to the other side of the plate 60. The quantity of the liquid 2 may change the capacitance $C_1$ between the electrodes 207 and 208. Accordingly, an oscillation circuit (not shown) similar to that shown in FIG. 4 may output a sensed signal having an oscillation frequency depending on the capacitance $C_1$, i.e., the quantity of the liquid 2.

FIGS. 11 to 16 are views of other electrode patterns in a sensing apparatus in accordance with the present invention. These electrode patterns are alternatives of those shown in FIGS. 2 and 7 to 10.

Figure 11:
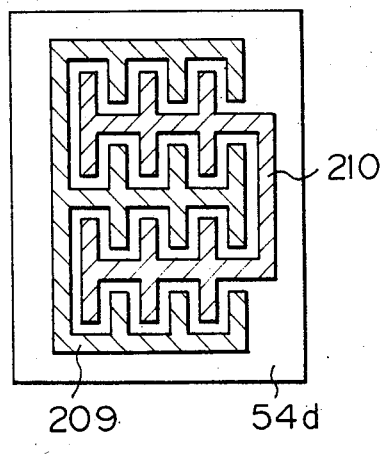
FIG. 11 is a plane view of still another alternative of the sensing apparatus in accordance with the present invention.

In FIG. 11, a pair of bent interdigital electrodes 209 and 210 are provided on a PC board 54d.

Figure 12:
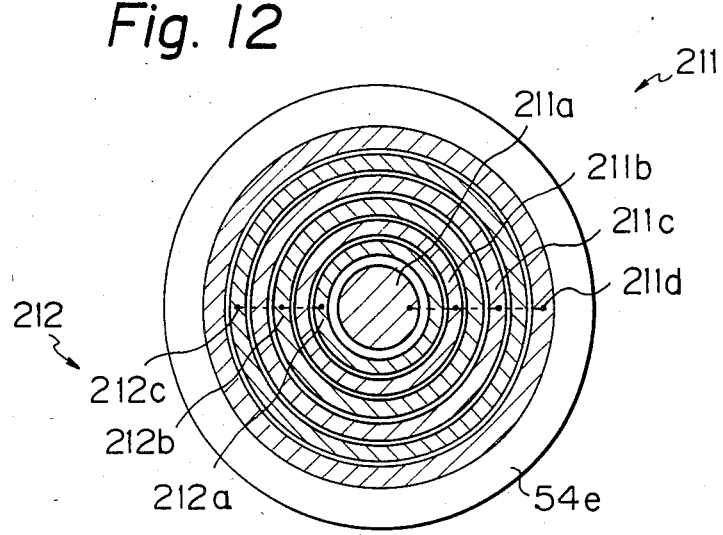
FIG. 12 is a plane view of other alternative of the sensing apparatus in accordance with the present invention.

In FIG. 12, a pair of ring electrodes 211 and 212 are provided on a PC board 54e. A first ring electrode 211 consists of a plurality of concentric rings 211a to 211d. A second ring electrode 212 consists of a plurality of concentric rings 212a to 212c. The concentric rings 211a to 211d and 212a to 212c are alternatively arranged with each other at a predetermined distance.

Figure 13:
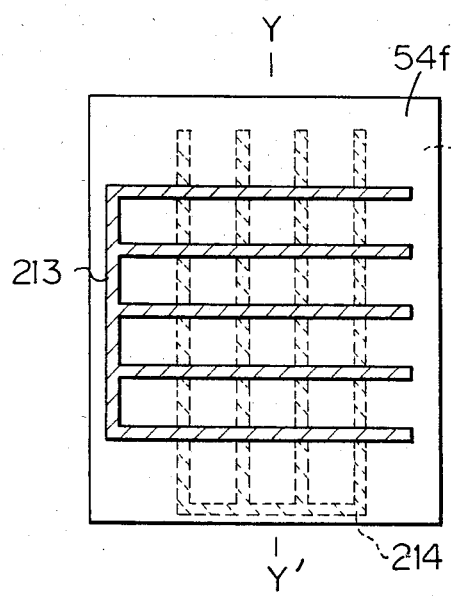
FIG. 13 is a plane view of still another alternative of the sensing apparatus in accordance with the present invention.
Figure 14:
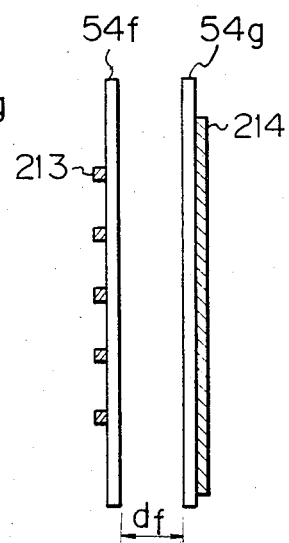
FIG. 14 is a sectional view of the sensing apparatus shown in FIG. 13, taken along a line Y-Y'.

FIG. 13 is a plane view of another alternative electrode arrangement of the present invention. FIG. 14 is a sectional view taken along line Y-Y' in FIG. 13.

In FIGS. 13 and 14, an electrode 213 is formed on a PC board 54f made of an insulating material and has a plurality of blades like that of a plow. An electrode 214 is also formed on a PC board 54g oppositely arranged to the PC board 54f at a predetermined distance $d_f$. The PC board 54g is also made of an insulating material. The electrode 214 also has a plurality of blades 114e those of a plow, which blades perpendicularly intersect the blades of the electrode 213 when see from FIG. 13. The liquid to be sensed may be inserted between the PC boards 54f and 54g.

Figure 15:
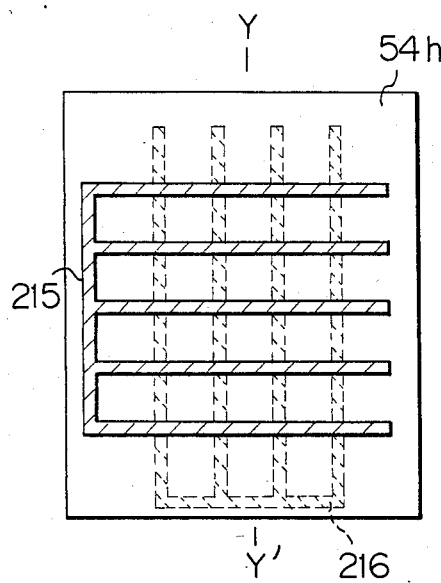
FIG. 15 is a plane view of still another alternative of the sensing apparatus in accordance with the present invention.
Figure 16:
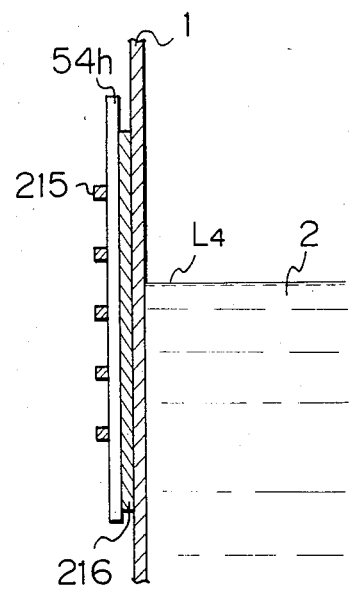
FIG. 16 is a sectional view of the sensing apparatus shown in FIG. 15, taken along a line Y-Y'.

FIG. 15 is a plane view of another alternative electrode arrangement of the present invention. FIG. 16 is a sectional view taken along line Y-Y' in FIG. 15.

In FIGS. 15 and 16, an electrode 215 is formed on a side of a PC board 54h made of an insulating material and has a plurality of blades like that of a plow. An electrode 216 is also formed on another side of the PC board 54h, and has a plurality of blades like that of a plow. The blades of the electrode 215 perpendicularly intersect the blades of the electrode 216 when seen from FIG. 15. The electrode 216 contacts the outer wall of the vessel 1 which contains the liquid 2 whose level $L_4$ is to be sensed. The capacitance produced between the electrodes 215 and 216 is varied in response to the level of the liquid 2.

The alternatives described with reference to the first embodiment of FIGS. 1 to 6 also apply to the embodiments mentioned above with reference to FIGS. 7 to 16.

The electric circuit for outputting the sensed signal is not restricted to the oscillation circuit 100 shown in FIG. 4. The electric circuit can also be, for example, a bridge circuit outputting a sense signal with an analog value in response to the change of the capacitance $C_1$ mentioned before.

We claim:

1. A sensing apparatus for sensing existence of a substance, comprising:
    containing means for containing the substance, said containing means being formed of an electrically insulating substance;
    electroconductive support means for electrically grounding at least one end of said containing means;
    a first electrode member mounted directly on a surface of said containing means;
    a second electrode member mounted directly on said surface of said containing means, and arranged at an opposing position a predetermined distance away from and electrically isolated from said first electrode member; and
    electric circuit means for detecting a capacitance formed between said first and second electrodes, said electric circuit means being operatively connected to said first and second electrode members and to said ground;
    said first and second electrode members being operatively connected by a first capacitance (Ca) formed by a part of said containing means between said first and second electrode members and a second capacitance (Cc) formed by said substance to be sensed between the first and second electrode members in said containing means, and
    said electric circuit means outputting a signal in response to changes in said first and second capacitances with respect to a reference capacitance circuit (Cb, Cd) to ground.

2. A sensing apparatus according to claim 1, wherein said first and said second electrode members have interdigital shapes having a predetermined number of teeth, their teeth being oppositely and alternatively arranged at predetermined distances.

3. A sensing apparatus according to claim 2, wherein the first and the second electrode members are formed on a plate of insulating material and their surfaces closely contact one side of another plate arranged at an opposing position a predetermined distance away, also made of insulating material, contacting the substance to be sensed at the other side.

4. A sensing apparatus according to claim 1, wherein said first and said second electrode members have bent interdigital shapes having a predetermined number of teeth, their teeth being oppositely and alternatively arranged at predetermined distances.

5. A sensing apparatus according to claim 4, wherein the first and the second electrode members are formed on a plate of insulating material and their surfaces closely contact one side of another plate arranged at an opposing position a predetermined distance away, also made of insulating material, contacting the substance to be sensed at the other side.

6. A sensing apparatus according to claim 1, wherein said first electrode member includes a plurality of concentric rings, each having a predetermined width and spaced from each other a predetermined distance, and said second electrode member includes a plurality of concentric rings, each having a predetermined width and spaced from each other a predetermined distance, each concentric ring of the second electrode member being interposed between corresponding concentric rings of the first electrode member at a predetermined distance.

7. A sensing apparatus according to claim 6, wherein the first and the second electrode members are formed on a plate of insulating material and their surfaces closely contact one side of another plate arranged at an opposing position a predetermined distance away, also made of insulating material, contacting the substance to be sensed at the other side.

8. A sensing apparatus according to claim 1, wherein said first electrode member has a plow shape having a plurality of parallel blades and is formed on one side of a plate and said second electrode member has a plow shape having a plurality of parallel blades and is formed on one side of another plate arranged at an opposing position a predetermined distance away, the plurality of blades of the second electrode member being perpendicular to the plurality of blades of the first electrode member, and the substance to be sensed being inserted into a space defined between the other sides of said one and another plates.

9. A sensing apparatus according to claim 1, wherein said first electrode member has a plow shape having a plurality of parallel blades and is formed on one side of a plate of an insulating material and said second electrode member has a plow shape having a plurality of parallel blades and is formed on the other side of said plate, the plurality of blades of the first electrode member being perpendicular to the plurality of blades of the second electrode member, and one of the electrodes being contacted directly or indirectly with the substance to be sensed.

10. A sensing apparatus according to claim 1, wherein said first and said second electrode members are formed in a rectangular shape having long sides, the longitudinal axis of the rectangular electrode members perpendicular to a level of the substance to be sensed.

11. A sensing apparatus according to claim 10, wherein the first and second electrode members are thin films formed on a plate made of insulating material.

12. A sensing apparatus according to claim 1, wherein said first and second electrode members have interdigital shapes having a predetermined number of teeth in a longitudinal direction, their teeth being oppositely and alternatively arranged at predetermined distances, and their longitudinal axes being perpendicular to a level of the substance to be sensed.

13. A sensing apparatus according to claim 12, wherein the first and second electrode members are thin films formed on a plate made of insulating material.

14. A sensing apparatus according to claim 1, wherein said substance is liquid.

15. A sensing apparatus according to claim 14, wherein said liquid has an electroconductive property.

16. A sensing apparatus according to claim 14, wherein said liquid has a non-electroconductive property.

17. A sensing apparatus according to claim 1, wherein said substance is a powder.

18. A sensing apparatus according to claim 17, wherein said powder has an electroconductive property.

19. A sensing apparatus according to claim 17, wherein said powder has a non-electroconductive property.

20. A sensing apparatus according to claim 1, wherein said substance is granular.

21. A sensing apparatus according to claim 20, wherein said granular substance has an electroconductive property.

22. A sensing apparatus according to claim 20, wherein said granular substance has a non-electroconductive property.

23. A sensing apparatus according to claim 1, wherein said substance is a large solid.

24. A sensing apparatus according to claim 23, wherein said large solid has an electroconductive property.

25. A sensing apparatus according to claim 23, wherein said solid has a non-electroconductive property.

* * * * *